United States Patent [19]

Orlowski

[11] Patent Number: 4,989,883
[45] Date of Patent: Feb. 5, 1991

[54] STATIC AND DYNAMIC SHAFT SEAL ASSEMBLY

[75] Inventor: David C. Orlowski, Rock Island, Ill.

[73] Assignee: Inpro Companies, Inc., Rock Island, Ill.

[21] Appl. No.: 365,895

[22] Filed: Jun. 14, 1989

[51] Int. Cl.⁵ .............................................. F16J 15/16
[52] U.S. Cl. ....................................... 277/25; 277/53; 277/226
[58] Field of Search ................... 277/53, 55, 56, 57, 277/25, 34.3, 174, 226; 384/480, 488, 489, 478, 135, 144

[56] References Cited

U.S. PATENT DOCUMENTS

| | | |
|---|---|---|
| 2,467,955 | 4/1949 | Berninger .............................. 277/25 |
| 3,026,112 | 3/1962 | Mayer . |
| 3,042,417 | 7/1962 | Derman et al. ........................ 277/25 |
| 3,815,926 | 6/1974 | Vore . |
| 4,022,479 | 5/1977 | Orlowski . |
| 4,114,058 | 9/1978 | Albaric . |
| 4,114,902 | 9/1978 | Orlowski . |
| 4,175,752 | 11/1979 | Orlowski . |
| 4,257,617 | 3/1981 | Hill . |
| 4,304,409 | 12/1981 | Orlowski . |
| 4,466,620 | 8/1984 | Orlowski . |
| 4,565,378 | 1/1986 | Wehrfritz et al. ..................... 277/53 |
| 4,572,517 | 2/1986 | Rockwood et al. . |
| 4,630,458 | 12/1986 | Kakabaker . |
| 4,706,968 | 11/1987 | Orlowski . |
| 4,743,034 | 5/1988 | Kakabaker . |
| 4,830,182 | 5/1989 | Nakerzato et al. .................. 277/226 |
| 4,832,350 | 5/1989 | Orlowski ............................... 277/53 |

FOREIGN PATENT DOCUMENTS 2041463  9/1980  United Kingdom ................. 277/56

Primary Examiner—Allan N. Shoap
Assistant Examiner—Daniel G. DePumpo
Attorney, Agent, or Firm—Zarley, McKee, Thomte, Voorhees & Sease

[57] ABSTRACT

An isolator mechanism is provided for use with a machinery housing and a rotatable shaft protruding through the housing. The isolator mechanism comprises a stator ring affixed to the housing and a rotor ring which is attached to the shaft and which nests within the stator. The stator and rotor are so shaped that the stator has a male cylindrical surface, and the rotor has a female cylindrical surface located radially outwardly of the stator male surface. A deformable annular seal member is mounted on the rotor female surface and engages the stator male surface when the rotor and seal member are at rest. However, the deformable seal member is deformed by centrifugal motion into a configuration out of engagement with the stator when the rotor and seal member are moving at operating speeds.

20 Claims, 2 Drawing Sheets

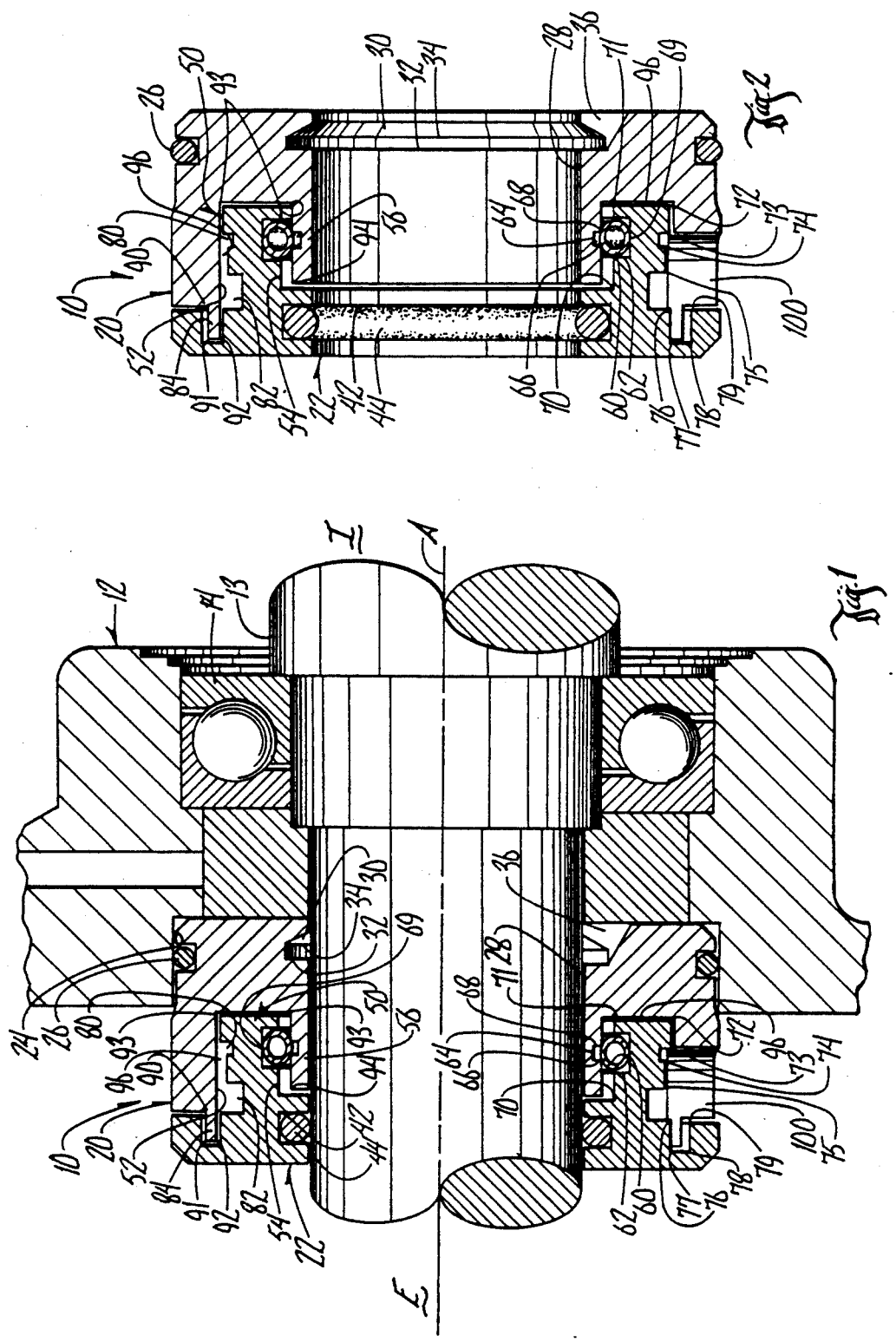

STATIC AND DYNAMIC SHAFT SEAL ASSEMBLY

BACKGROUND OF THE INVENTION

This invention relates generally to mechanical equipment shaft sealing devices and more particularly concerns a shaft seal mechanism which seals effectively when a shaft is at rest, and which changes configurations so as to seal effectively but without friction when the shaft is rotating at an operating speed.

Auxiliary mechanical equipment shaft seals, sometimes called bearing isolators or sealing rings, have become increasingly important to modern mechanical equipment, especially for equipment called upon to operate in hostile applications. For example, mechanical power transmission units used in rock quarries are often subjected to highly abrasive dust particles. Normal elastomeric lip or O-ring shaft seals can quickly wear out and fail in environments such as these. Dust and exterior contaminants cannot be excluded from the interior of the transmission housing by a failed standard sealing device. Nor can oil or other fluids be prevented from leaking out of the transmission devices past a ruined O-ring or a worn lip seal.

To prevent the ingress of corruption and the egress of lubricating fluids, a number of auxiliary or improved primary sealing arrangements and devices have been provided. Some of these sealing devices provide a physical engagement of the shaft and a wiping action while the shaft operates. Other devices provide an interengagement and wiping action between seal parts. But in both such arrangements, the inevitable friction causes inevitable part wear. Moreover, that friction can significantly degrade equipment performance in some situations.

Some of these commercially successful seal devices do not require any actual physical interengagement of the sealing member parts. Among such devices which have met with considerable commercial acceptance are those disclosed in Orlowski U.S. Pat. Nos. 4,706,968; 4,466,620; 4,175,752; 4,114,902; and 4,022,479.

It is the general object of the present invention to provide a seal for use with machinery having a housing through which a rotatable shaft protrudes, and which provides effective part-to-part contact static sealing action when the shaft is stationary and which provides effective non-contact dynamic sealing action when the shaft is rotating.

It is another object to provide a machinery seal of the type described in which a seal member engages both a seal stator and a seal rotor when the shaft is at rest, but in which the sealing member disengages from the stator when the shaft rotates at a normal operating speed.

Yet another object to provide a seal of the type described which is relatively inexpensive to manufacture.

Still another object is to provide a seal of the type described which will provide a long, trouble-free service life.

To accomplish these objectives, an isolator mechanism is provided for use with a machinery housing and a rotatable shaft protruding through the housing. The isolator mechanism comprises a stator ring affixed to the housing and a rotor ring which is attached to the shaft. The stator and rotor are so shaped that the stator has a male cylindrical surface, and the rotor has a female cylindrical surface located radially outwardly of the stator male surface. A deformable annular seal member is mounted on the rotor female surface and engages the stator male surface when the rotor and seal member are at rest. However, the seal member is deformed by centrifugal force into a configuration out of engagement with the stator when the rotor and seal member are moving at operating speeds.

Other objects, advantages and embodiments of the invention will become apparent upon reading the following detailed description and upon reference to the drawings. Throughout the drawings, like reference numerals refer to like parts.

BRIEF DESCRIPTION OF THE DRAWINGS

FIG. 1 is a sectional view of a typical machinery housing, bearing, and protruding shaft upon which is mounted a novel seal of the present invention;

FIG. 2 is a sectional view similar to FIG. 1 but showing the seal in further detail;

DETAILED DESCRIPTION

Figure 3:
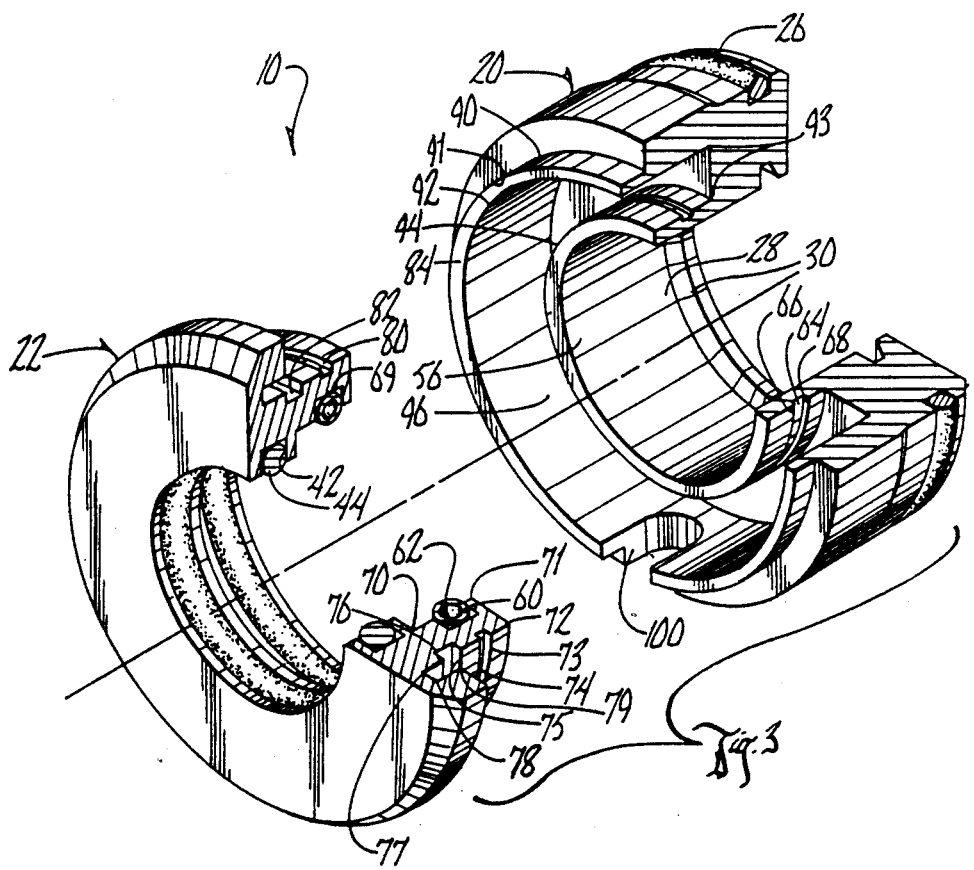
FIG. 3 is an exploded view of the novel seal.

While the invention will be described in connection with a preferred embodiment, it will be understood that it is not intended to limit the invention to this embodiment. On the contrary, it is intended to cover all alternatives, modifications and equivalents as may be included within the spirit and scope of the invention.

Turning first to FIG. 1, there is shown the novel seal or bearing isolator 10 as it appears when installed on and within a housing 12. A rotatable shaft 13 protrudes through this seal 10 and the housing 12. A bearing 14 is functionally interposed between the stationary housing 12 and the rotatable shaft 13 in known manner.

As shown in FIGS. 2, and 3, the novel seal comprises, in general, a ring-like stator 20 which is here affixed to the housing 12 and a mating rotor ring 22 which is secured to the shaft 13, and which follows the rotational motion of the shaft 13. The rotor and stator 20 and 22 can be formed of any suitable material such as bronze or steel of an appropriate formulation. The stator 20 is designed and sized to fit securely by means of a metal-to-metal interference fit within a recess 24 formed in the housing 12, and an O-ring seal 26 of known sort provides an effective and permanent seal between the stator 20 and the housing 12 so as to exclude dust and other corruption from the outside environment E, and to inhibit or prohibit the leakage of oil or other fluid from the housing inside I. As shown particularly in FIG. 3, the stator 20 is annular in general shape, but is formed so that its inner surface 28 is generally cylindrical in shape, and is sized to provide a modest clearance between that surface 28 and the adjacent outer surface of the shaft 13. Thus, the stator 20 is rigidly affixed to the housing 12 but does not engage the shaft 13.

To collect lubricating fluids and inhibit their passage down the shaft 13, an annular fluid catchment groove 30 can be formed in the interior of the stator 20. The illustrated groove 30 is provided with a first or downstream face 32 oriented generally perpendicularly to the axis A of the shaft 13, and a second opposed face 34 which is conical in shape. This groove configuration has been found to be effective in collecting oil or other fluids which may flow along the surface of the shaft 13 in a direction leading from the interior I of the equipment housing towards the exterior environment E. A return or drain groove 36 located at the bottom of the stator 20 collects the accumulated oil or other fluid and encourages its return to the interior bottom of the housing 12.

The rotor 22 is affixed to and rotates with the shaft 13. To this end, the rotor 22 is provided with a restrictive recess 42 in which is mounted an O-ring 44 of known type. The O-ring 4 is sized and otherwise designed to be moderately compressed within the recess 42 and as to engage the shaft 13 with a modest amount of compressive pressure, in known manner.

To provide a static seal between the stator 20 and the stationary rotor 22 in accordance with the invention, the rotor 22 is formed with an axially-extending flange 50, and the stator 20 is provided with a mating recess 52. At their radially inner portions, the rotor flange 50 defines an axially-extending, cylindrical female surface 54 and the stator 20 has a mating, confronting, underlying, axially-extending surface 56. Between these surfaces 54 and 56 is interposed a resilient seal member 60, which engages both the stator 20 and the rotor 22 when the shaft 13 and rotor 22 are at rest.

In the preferred embodiment, this resilient seal member 60 is loosely disposed in a recess 62 formed in the rotor flange 50, and the sealing member 60 is sized and shaped so as to engage the confronting and adjacent stator male surface 56 when the rotor 22 and shaft 13 are not in motion. To improve seal-stator engagement and sealing contact when the seal and rotor are at rest, the stator surface 56 is interrupted by a groove 64 which is axially centered relative to the recess 62. This groove 64 defines two opposed shoulders 66, 68. The shoulders 66, 68 engage the resilient seal member 60 along two opposed annular lines of contact when the rotor 22 is not in motion. Thus, positive, physical seal engagement occurs between the sealing member 60 and the stator 20 along the two opposed annular shoulders 66, 68; and positive, physical engagement between the seal member 60 and the rotor 22 occurs at all times along an annular line of contact 69 between the seal 60 and the back or bottom of the recess 62. The at-rest configuration of the seal parts is shown in FIG. 4.

Figures 4, 5:
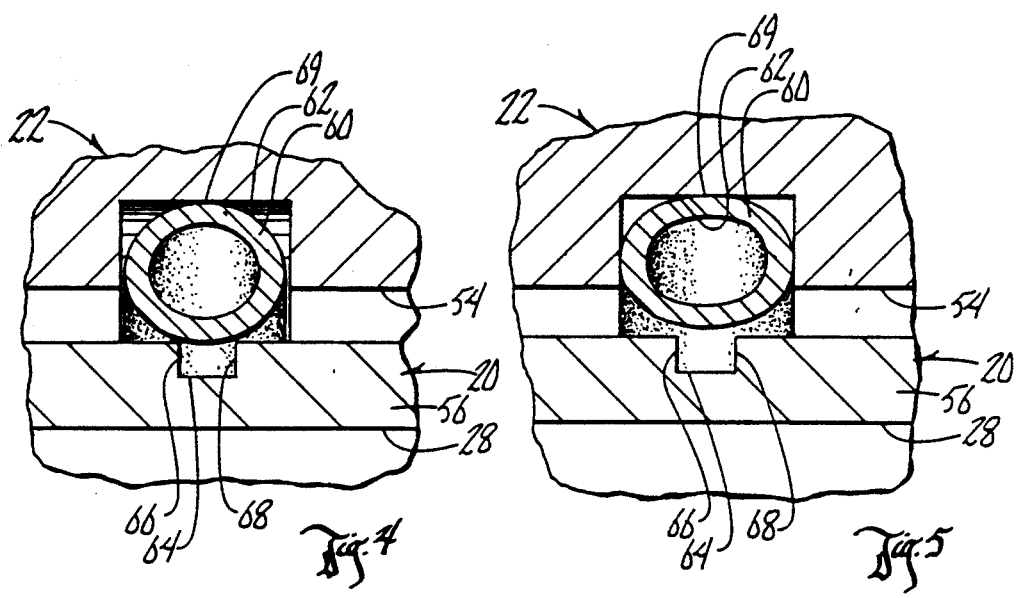
FIG. 4 is a fragmentary sectional view showing portions of seal parts as they appear when the shaft is not rotating.
FIG. 5 is a fragmentary sectional view similar to FIG. 4 but showing the bearing seal parts as they appear when the shaft is rotating at an operating speed.

However, in further accordance with the invention, the seal member 60 centrifugates away from its engagement with the stator 20 when the rotor 22 and shaft 13 are turning at an operating speed, as shown particularly in FIG. 5. The recess 62 is limited in its axial extent so as to restrain excessive deformation of the sealing member during rotation. This lift-off or seal disengagement occurs because the centrifugal force applied to and experienced by the seal member 60 causes that seal member 60 to deform into the recess 62 and away from the underlying stator male surface 56, as particularly shown in FIG. 5. Under these circumstances, there is no physical interengagement between an static portion of the seal and any rotating portion of the seal when the shaft is turning at its operating speed. Accordingly, the sealing member is dynamically effective to inhibit the ingress of corruption or the egress of fluids, yet it is frictionless and does not wear in operation.

Preferably this resilient seal member 60 is a hollow toroid formed of a TYGON brand tubing offered by the Norton Industrial Plastics Company, P.O. Box 350, Akron, Ohio 44310. TYGON Type R-3603 tubing having a ⅛ inch outer diameter and a 1/16 inch inner diameter has been successfully employed in making these sealing members 60.

As will be understood by those skilled in the relevant arts, the seal member 60 increasingly deforms and lifts away from engagement with the underlying stator as the centrifugal forces increase. These centrifugal forces increase in squared proportion to the linear speed of the moving sealing element 60. It is recommended that the bearing seal 10 be sized and arranged so that the seal member 60 experiences a minimum peripheral translational speed of from 600 to 800 feet per minute when the shaft is turning at its normal operating speed.

In carrying out the invention, additional surface formations are provided in the stator recess 52 and mating rotor flange 50 to inhibit the ingress of corruption and the egress of fluids, especially when the shaft 13 is rotating. Here, the rotor flange 50 is formed so as to have a series of shoulders or corners 70-79 and annular collection grooves 80, 82. The stator recess 52 is likewise provided with a mating projection 84 and corners 90-94. These concentric stator and rotor rings define an annular, convoluted, labyrinthine passage 96 of extended length and various sizes or thicknesses. This path is, at its thinnest portion, from 0.002 inches to 0.150 inches in radius or thickness. Consequently, the rotor can spin or rotate within the stator with practically zero friction between the respective surfaces. The labyrinth path effectively prevents lubricants from passing outwardly from the interior housing I to the exterior E, and also prevents the ingress of corruption from the exterior E of the interior I.

At the bottom of the stator 22 is located a radially-inwardly extending bore 100 which communicates with this collection groove 96. The bore 100 leads to the outside E of the machine housing 12, and permits corruption and other materials which may have collected within the collection groove 96 to expell out of and away from the seal device 10.

It will be observed that the manufacture of the stator 20, the rotor 22 and the seal 60 can be accomplished quickly and easily by known methods. When assembled, the stator and rotor do not physically engage one another and are interference-free both in configuration and in dynamic operation.

I claim:

1. A bearing isolator functionally interposed between a machinery housing and a rotatable shaft extending through the housing for isolating a shaft bearing and housing interior from an environment outside the housing; the isolator comprising, in combination, a stator member adapted for connection to the housing, a rotor adapted to be mounted on the shaft, the stator and rotor being formed with a flange and mating recess having opposed annular, axially-extending surfaces, the rotor having a radially extending recess located to confront the annular axially-extending stator surface, and an annular, resilient seal member disposed in the recess and adapter to sealingly engage the rotor and the adjacent stator annular surface when the rotor is not in motion to prevent egress of lubricants from the housing interior and ingress of contaminants from the environment, the seal member being adapted to be directed radially away from and out of contact with the adjacent stator surface when the rotor is in operating motion.

2. A bearing isolator according to claim 1 wherein said seal member is toroidal in shape.

3. A bearing isolator according to claim 2 wherein said seal member is hollow.

4. A bearing isolator according to claim 1 wherein said seal member is formed of a resilient vinyl material.

5. A bearing isolator according to claim 1 wherein said annular, axially-extending stator surface is interrupted by a radially extending groove axially aligned with but opposed to said recess so as to receive and engage said resilient seal member along two opposed annular lines of contact when the rotor is not in operational motion.

6. A bearing isolator according to claim 5 wherein said groove is axially centered relative to said recess.

7. A bearing isolator according to claim 1 wherein said stator and rotor flange and recess are matingly shaped and, when assembled, nested, so as to provide a thin annular labyrinthine path of clearance between the stator and rotor to inhibit the egress of lubrication fluids from the machine housing and to inhibit the ingress of contaminants from the environment surrounding the machine housing.

8. An isolator mechanism for use with a housing and a rotatable shaft protruding through the housing, the isolator comprising, in combination,
a stator member adapted for connection to the housing,
a rotor member adapted for connection to the shaft,
the stator having an axially-extending male cylindrical surface, and the rotor having an axially-extending female cylindrical surface located radially outwardly of the stator male cylindrical surface,
the isolator further including a deformable annular seal member sealingly mounted on the rotor female cylindrical surface and sealingly engaging the stator male surface when the rotor and seal members are at rest, but deforming into a configuration out of engagement with the stator when the rotor is moving at an operating speed.

9. An isolator mechanism according to claim 8 wherein said seal member is a hollow toroid.

10. An isolator according to claim 8 wherein said rotor female cylindrical surface is interrupted by a radially extending recess adapter to substantially contain said seal member.

11. An isolator according to claim 10 wherein said stator male cylindrical surface is interrupted by a radially extending groove opposed to and axially centered with respect to said recess.

12. An isolator according to claim 8 wherein said recess is of limited axial extent so as to inhibit excessive deformation of said sealing member when said rotor and seal member are moving at an operational speed.

13. An isolator according to claim 8 wherein a fluid catchment groove is formed in said stator at a location axially inwardly of the location of said seal member.

14. An isolator according to claim 13 wherein said fluid catchment groove is defined by a downstream face oriented perpendicularly to the axis of the shaft and by a conical upstream face.

15. An isolator mechanism for use with a housing and a rotatable shaft protruding through the housing, the isolator comprising, in combination,
a stator member adapted to be affixed into the housing,
a rotor member adapted to be affixed to the shaft for rotation therewith, and
a toroidal, resilient deformable annular seal member sealingly engaging both the stator and the rotor when the rotor and seal members are at rest, but deforming into an oval configuration out of engagement with the stator when the rotor is moving at an operation speed so as to prevent the ingress or egress of material into or out of the housing.

16. The bearing isolator according to claim 1 wherein the recess has a depth which is less than the cross-sectional diameter of the annular seal member such than a portion of the seal member expands radially and axially away from and out of contact with the stator surface when the rotor is in operating motion.

17. A method of sealing a shaft bearing, the shaft rotatably extending from a housing, the method comprising:
fixing a stator on the housing concentrically about the shaft;
sealingly mounting a rotor on the shaft exteriorly of the housing for rotation with the shaft;
the stator and rotor having overlapping, radially spaced cylindrical surfaces; and
mounting an annular seal member in the space between the cylindrical surfaces of the stator and rotor such that the sealing member sealingly engages both surfaces when the rotor is not rotating and such that the sealing member moves out of sealing engagement with the stator cylindrical surface when the rotor is rotating.

18. The method of claim 17 wherein centrifugal force radially expands the seal member out of sealing engagement with the cylindrical surface of the stator.

19. A method of preventing lubricant egress from and contaminant ingress to bearings of a rotary shaft of a machine, comprising:
mounting a bearing isolator about the shaft, the isolator having a stator fixed to the machine and a rotor rotatably mounted on the shaft, the stator and rotor being matingly fit together with spaced apart radially opposed surfaces; and
sealing the opposed surfaces with a seal member which engages both opposed surfaces when the rotor is at rest, and which radially expands away from the cylindrical surface of the stator when the rotor rotates to prevent friction between the seal member and the stator.

20. The method of claim 19 wherein centrifugal force moves the seal member out of engagement with the stator upon rotation of the rotor.

* * * * *